(12) United States Patent
Tajan et al.

(10) Patent No.: US 10,549,843 B2
(45) Date of Patent: Feb. 4, 2020

(54) PITCH CHANGE SYSTEM EQUIPPED WITH MEANS FOR SUPPLYING FLUID TO A CONTROL MEANS AND CORRESPONDING TURBINE ENGINE

(71) Applicant: SAFRAN AIRCRAFT ENGINES, Paris (FR)

(72) Inventors: Sébastien Emile Philippe Tajan, Sucy en Brie (FR); Adrien Jacques Philippe Fabre, Montrouge (FR); Paul Antoine Foresto, Fontainebleau (FR); Régis Eugène Henri Servant, Vigneux sur Seine (FR); Stéphane Ibarzo, Boucau (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 247 days.

(21) Appl. No.: 15/672,763

(22) Filed: Aug. 9, 2017

(65) Prior Publication Data
US 2018/0043991 A1    Feb. 15, 2018

(30) Foreign Application Priority Data
Aug. 10, 2016 (FR) ..................... 16 57686

(51) Int. Cl.
*B64C 11/38* (2006.01)
(52) U.S. Cl.
CPC .................... *B64C 11/38* (2013.01)
(58) Field of Classification Search
CPC ........ B64C 11/30; B64C 11/306; B64C 11/38
See application file for complete search history.

(56) References Cited

U.S. PATENT DOCUMENTS 4,927,329 A * 5/1990 Kliman ..................... F01D 7/00
416/127
5,174,716 A * 12/1992 Hora ....................... B64C 11/32
416/129

(Continued)

FOREIGN PATENT DOCUMENTS

| EP | 0 493 005 A1 | 7/1992 |
| FR | 3 013 325 A1 | 5/2015 |

OTHER PUBLICATIONS

Preliminary Search Report and Written Opinion of the Institut National de la Propriété Industrielle dated Apr. 6, 2017, for corresponding French Application No. 1657686, filed Aug. 10, 2016, 6 pages.

*Primary Examiner* — Woody A Lee, Jr.
(74) *Attorney, Agent, or Firm* — Christensen O'Connor Johnson Kindness PLLC (57) ABSTRACT

A system is configured to change the pitch of blades of at least one turbine engine propeller provided with multiple blades. The system includes a control means acting on a connecting mechanism connected to the blades of the propeller. The control means includes a stationary body and a movable body translatable along a longitudinal axis (X) relative to the stationary body and defining two chambers. A fluid supply means is configured to be connected to a fluid supply source and to supply the chambers. The fluid supply means includes at least one channel. The channel is arranged and extends along an axis (Q) parallel to the longitudinal axis in an overthickness of a wall of the stationary body, the overthickness extending radially inside relative to the longitudinal axis.

20 Claims, 5 Drawing Sheets (56) References Cited

U.S. PATENT DOCUMENTS

| | | | | |
|---|---|---|---|---|
| 5,213,471 A | * | 5/1993 | Miller | B64C 11/325 |
| | | | | 416/129 |
| 5,281,095 A | * | 1/1994 | Komura | B64C 11/30 |
| | | | | 416/147 |
| 5,478,203 A | * | 12/1995 | Barker | F01D 7/02 |
| | | | | 415/147 |
| 5,685,694 A | * | 11/1997 | Jones | F01D 7/02 |
| | | | | 416/147 |
| 5,810,561 A | * | 9/1998 | Cossette | B63H 3/12 |
| | | | | 416/153 |
| 6,253,716 B1 | * | 7/2001 | Palmer | F01P 7/06 |
| | | | | 123/41.12 |
| 9,708,053 B2 | | 7/2017 | Curlier et al. | |
| 2015/0139802 A1 | * | 5/2015 | Curlier | B64C 11/306 |
| | | | | 416/147 |

* cited by examiner

PITCH CHANGE SYSTEM EQUIPPED WITH MEANS FOR SUPPLYING FLUID TO A CONTROL MEANS AND CORRESPONDING TURBINE ENGINE

BACKGROUND

The present invention relates to the field aeronautic propulsion. It relates to a system for changing the pitch of blades of a propeller driven by a turbine engine, and in particular means for supplying fluid to a control means of said pitch change system. The invention also relates to a turbine engine equipped with such a pitch change system.

The change of pitch or variable calibration of blades of a turbine engine propeller is one way for improving the performance and output of turbine engines under different flight conditions.

Turboprops, for example with pairs of despun propellers, referred to by the expressions "open rotor" and "unducted fan", equipped with these pitch change systems are known. Turboprops differ from turbojet engines by the use of a propeller outside the nacelle (unducted) instead of an internal fan. The pitch change system may also apply to a turboprop with a propeller or adapt indifferently to several propellers.

In a turboprop of the open rotor type, a gas-generating part and a propulsion part are aligned and arranged in a stationary cylindrical nacelle supported by the structure of the aircraft. The gas-generating part can be arranged in front of or behind the propulsion part. The gases circulate in the turboprop from upstream to downstream. The propulsion part includes a pair of coaxial and despun propellers, upstream and downstream, respectively, that are rotated in opposite directions relative to one another by a turbine, in particular a low-pressure turbine, of the gas-generating part via a reduction gear, for example a planetary gear set. The propellers extend substantially radially across from the transmission shaft with a longitudinal axis to the outside the nacelle. In general, each propeller comprises a substantially cylindrical rotary case carrying an outer polygonal hub received rotatably around the longitudinal axis in the stationary nacelle. The hub includes radial cylindrical housings distributed on its periphery around the longitudinal axis. Shafts, with radial axes, here perpendicular to the longitudinal axis of the turbine engine, secured to roots of the blades, are received in the housings of the polygonal rings and extend toward the inside of the turbine engine.

An example system for changing the pitch of each propeller is known from document WO2013/050704. In FIG. 2, this pitch change system 23A is installed in the core of the rotary parts of a turbine engine, such as that shown in FIG. 1, for example with an annular control cylinder 25A rotating the roots of the blades. The annular control cylinder 25A includes a cylinder 27A mounted on a stationary case 13A and a piston 29A movable relative to the cylinder 27A. The movable piston 29A is connected to a connecting mechanism 26A, which is connected to each shaft 47A with a radial axis. The cylindrical rotary case 11A rotates around the stationary case 13A. To that end, at least one bearing 12A is arranged between the stationary case 13A and the rotary case 11A. The system further comprises means for supplying fluid to the annular control cylinder allowing the movable piston 29A to move relative to the cylinder. The movement of the movable piston 29A following the fluid command of the annular control cylinder 25A ensures the desired angular pivoting of the blades by the connecting mechanism 26A by pivoting the radial shafts 47A connected to the blades.

However, such an architecture consisting of converting power arriving from the stationary part of the stationary nacelle into movement on the rotating part of the turbine engine presents many difficulties. One of the difficulties lies in the dimensioning and the integration of the various elements into this rotating part. This in particular applies to the integration of the supply means of the control cylinder. One solution consists of using hydraulic channels made from piping that connect to the moving piston on the one hand, and the stationary nacelle on the other hand. Axial systems can also pass through the shaft of the propeller in the case of a single propeller. The integration of these piping or axial systems is complex, since they must be fastened both to the stationary and rotary parts, and must account for the small amount of space in and around the control cylinder. Furthermore, the control cylinder is subject to substantial radial forces from the rotary part that involve deformations of the control cylinder as well as sealing problems that are inevitably passed on to the supply means thereof. These forces are multiplied when the control cylinder is such that it plays a structural role.

The present invention in particular aims to propose supply means of the control means, in particular, of a system for changing the pitch of blades of a turbine engine propeller, taking into account the difficulties of integration in a cluttered environment.

SUMMARY

The invention provides a system for changing the pitch of blades of at least one turbine engine propeller provided with multiple blades, the system comprising a control means acting on a connecting mechanism connected to the blades of the propeller, said control means including a stationary body and a movable body translatable along a longitudinal axis relative to said stationary body, said movable body defining two chambers, and fluid supply means configured so as to be connected to a fluid supply source and to supply said chambers, the supply means comprising at least one channel arranged and extending along an axis parallel to the longitudinal axis in an overthickness of a wall of the stationary body, the overthickness extending radially inside the stationary body and at least partially along an outer cylindrical surface of the wall of the stationary body relative to the longitudinal axis and a connecting ring secured upstream from the stationary body and provided with hydraulic, mechanical and/or electrical connecting interfaces of the control means, the channel being connected on the one hand to a first hydraulic connection interface of the connecting ring connected to the fluid supply source, and on the other hand to at least one of the chambers, the channel comprising a channel portion communicating fluidly with the chamber by a first orifice emerging therein.

Thus, this solution makes it possible to achieve the aforementioned aim. In particular, the channel made in an overthickness of the wall of stationary body inside the latter makes it possible on the one hand to reduce the bulk, and on the other hand to avoid the constraints related to arranging piping between the rotary and stationary parts, and at the same time, leakage problems. The connecting ring makes it possible to produce the junction between the structural parts of the turbine engine and the parts relative to the actuator, and to group together, on a single part, all of the interfaces necessary for the supply and operation of the pitch change system, and in particular the control means. Indeed, the different known hydraulic, mechanical and electrical connecting interfaces of a pitch change system are separated and made using yokes, hydraulic couplings, and connectors, which affect the mass of the system. Owing to its multifunctional configuration, this ring according to the invention also makes it possible to simplify the arrangement, gain compactness and facilitate the passage of the compartments connected to the supply and the operation of the control means, without leakage risks. The connection of the inner channel on this control ring connected to the fluid supply source and emerging directly in at least one of the chambers of the control means makes it possible to facilitate the integration of such a system into an already-limited environment and to gain robustness.

According to one feature of the invention, the overthickness has a thickness comprised between $2 \times e_1$ and $5 \times e_1$, $e_1$ being the thickness of the wall of stationary body. This configuration makes it possible to facilitate the drilling of channels in the thickness of the wall. Furthermore, such a thickness makes it possible to stiffen the wall of the stationary body.

According to another feature of the invention, said channel portion extends along a direction having a predetermined angle with the axis of the channel so as to limit the pressure losses, which would affect the performance of the pitch change system, while ensuring industrial feasibility.

Advantageously, but non-limitingly, the predetermined angle is comprised between 40° and 70°. This value range makes it possible to optimize the limitation in terms of pressure loss, and the industrial feasibility.

In order to monitor the flow rate in the channel, the supply means comprise a flow rate limiter arranged in the overthickness and equipping the channel. In particular, the thickness of the flow rate limiter must be taken into account in calculating the overthickness in the wall of the stationary body.

According to another feature of the invention, the connecting ring is secured to a stationary case of the turbine engine. The control means of the present invention is mounted non-structurally and separately from the stationary case, the stationary body being secured to a cylindrical wall of the stationary case. On the one hand, this arrangement also participates, like the connecting ring, in allowing compactness and the leakage risk-free passage of the compartments connected to the power supply and the operation of the control means. The control means of this pitch change system is configured so as no longer to support the rotary parts and no longer to be subject to radial forces. Thus, the control means no longer undergoes a bending strain, causing misalignments and harmful leaks for the control means. On the other hand, also owing to this nonstructural arrangement, it is possible to manage the integration of the control means and the stationary and rotary cases independently.

According to another feature of the invention, the connecting interfaces are distributed over an outer cylindrical surface of the connecting ring.

According to another feature of the invention, the connecting interfaces are formed in a single piece with the connecting ring so as to simplify and facilitate manufacturing as well as assembly.

According to another feature of the invention, the channel is connected by a first end to the first hydraulic connecting interface connected to the fluid supply source.

According to another feature of the invention, the supply means comprise a connecting member fastened on the first hydraulic connecting interface and arranged so as to fluidly connect the supply source and the channel. This configuration makes it possible to facilitate the production of the system and the integration of the inner channel.

Advantageously, but non-limitingly, the connecting member is provided with a hollow cylindrical body, said first interface comprising a radial bore in which the hollow cylindrical body is housed coaxially and an axial bore coaxial with an orifice arranged in a wall of the cylindrical body so as to allow fluid circulation between the connecting ring and the channel. Such a configuration allows the circulation of fluid from the fluid supply source to the chambers of the control means. In addition, the connecting member makes it possible to limit the bulk in the pitch change system.

According to another feature of the invention, the first hydraulic connecting interface comprises at least one protrusion extending from a side flank of said interface and carrying means for measuring physical parameters of the fluid traversing said first interface.

Advantageously, but non-limitingly, this first hydraulic connecting interface is a high-pressure hydraulic interface.

Advantageously, but non-limitingly, the control means comprises an actuator, the movable body of which slides around the cylindrical wall of the stationary case. In particular, the actuator comprises an annular control cylinder.

The invention may also relate to a system for changing the pitch of blades of at least one turbine engine propeller provided with multiple blades, the system comprising a control means acting on a connecting mechanism connected to the blades of the propeller, said control means including a stationary body and a movable body translatable along a longitudinal axis relative to said stationary body and defining two chambers, and fluid supply means configured so as to be connected to a fluid supply source and to supply said chambers, the supply means comprising at least one channel including, upstream, a connecting ring secured to a stationary case of the turbine engine, the connecting ring being provided with hydraulic, mechanical and/or electrical connecting interfaces of the control means, a first hydraulic connection interface being connected to the fluid supply source on the one hand, and on the other hand to the channel. The connecting ring makes it possible to group together, on a single element, all of the interfaces necessary for the supply and operation of the control means. Owing to its multifunctional configuration, this ring also makes it possible to simplify the arrangement, gain compactness and facilitate the passage of the compartments connected to the supply and the operation of the control means, without leakage risks.

The invention also relates to a turbine engine comprising at least one pitch change system having any one of the aforementioned features.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
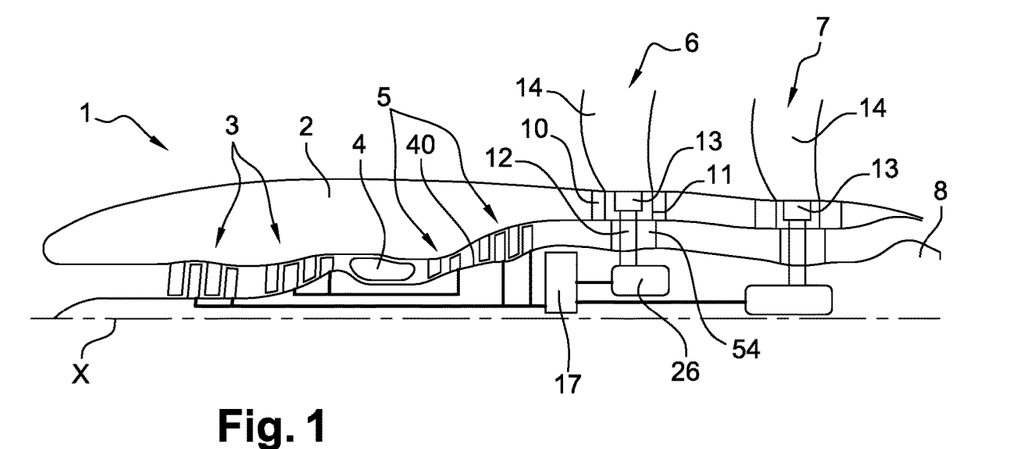
FIG. 1 is an axial sectional schematic view of an example turbine engine with a system for changing the pitch of blades of a propeller according to the invention.
Figure 2:
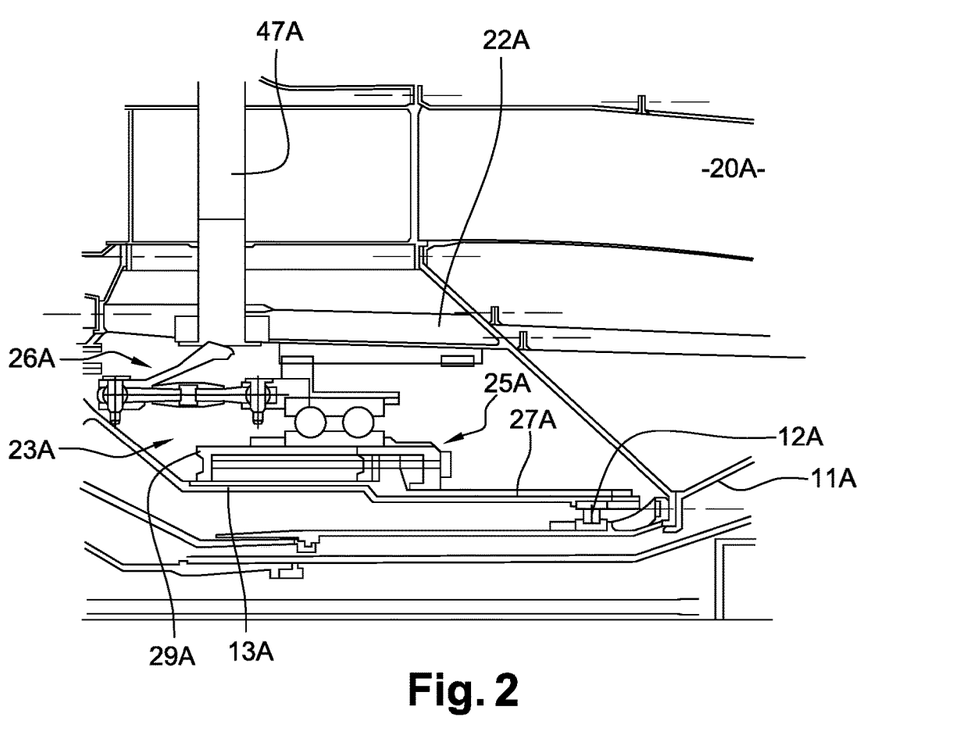
FIG. 2 is an example system for changing the pitch of blades of a propeller according to an example of the prior art.

In FIG. 1 and the rest of the description, a turbine engine such as a turboprop with an unducted fan with a longitudinal axis X intended to equip an aircraft is shown. However, the invention may apply to other types of turbine engine.

The turbine engine 1 comprises a nacelle 2 in which a gas generator is arranged that comprises, from upstream to downstream, a set of compressors 3, a combustion chamber 4 and a set of turbines 5. A jet nozzle 8 is arranged downstream from the gas generator.

In the present invention, and in general, the terms "upstream" and "downstream" are defined relative to the circulation of the gases in the turbine engine.

The set of compressors 3 may comprise one or two compressor(s), depending on the gas generator architecture with one or two stages. The set of turbines 5 may comprise a high-pressure turbine and a low-pressure turbine, or two high-pressure and intermediate-pressure turbines and a low-pressure turbine. The gas generator drives the low-pressure turbine around the longitudinal axis X.

The turbine engine comprises a pair of despun propellers with an upstream propeller 6 and a downstream propeller 7. These two upstream 6 and downstream 7 propellers are contra-rotated by the low-pressure turbine via a mechanical transmission device 17 that is schematically and simply shown. The upstream 6 and downstream 7 propellers are assembled coaxially to the longitudinal axis X of the turbine engine 1 and are arranged in parallel radial planes, which are perpendicular to the longitudinal axis X. In the present example, the propellers 6, 7 are mounted downstream from the gas generator. The mechanical transmission device 17 may comprise a differential reduction gear or a planetary gear set. It is of course possible to drive the upstream 6 and downstream 7 propellers directly via the low-pressure turbine.

According to the configuration described above, the stream of air entering the turbine engine is compressed in the set of compressors 3, then mixed with fuel and burned in the combustion chamber 4. The created combustion gases next enter the turbines 5 to drive, via the mechanical transmission device 17, the propellers 6, 7 in reverse rotation, providing the majority of the thrust. The combustion gases are expelled through the jet nozzle 8 while participating in the thrust of the turbine engine 1. The gases traverse a gas flow tunnel extending substantially axially in the turbine engine between the nacelle 2 and a median case 40 comprising the gas generator.

Figure 3:
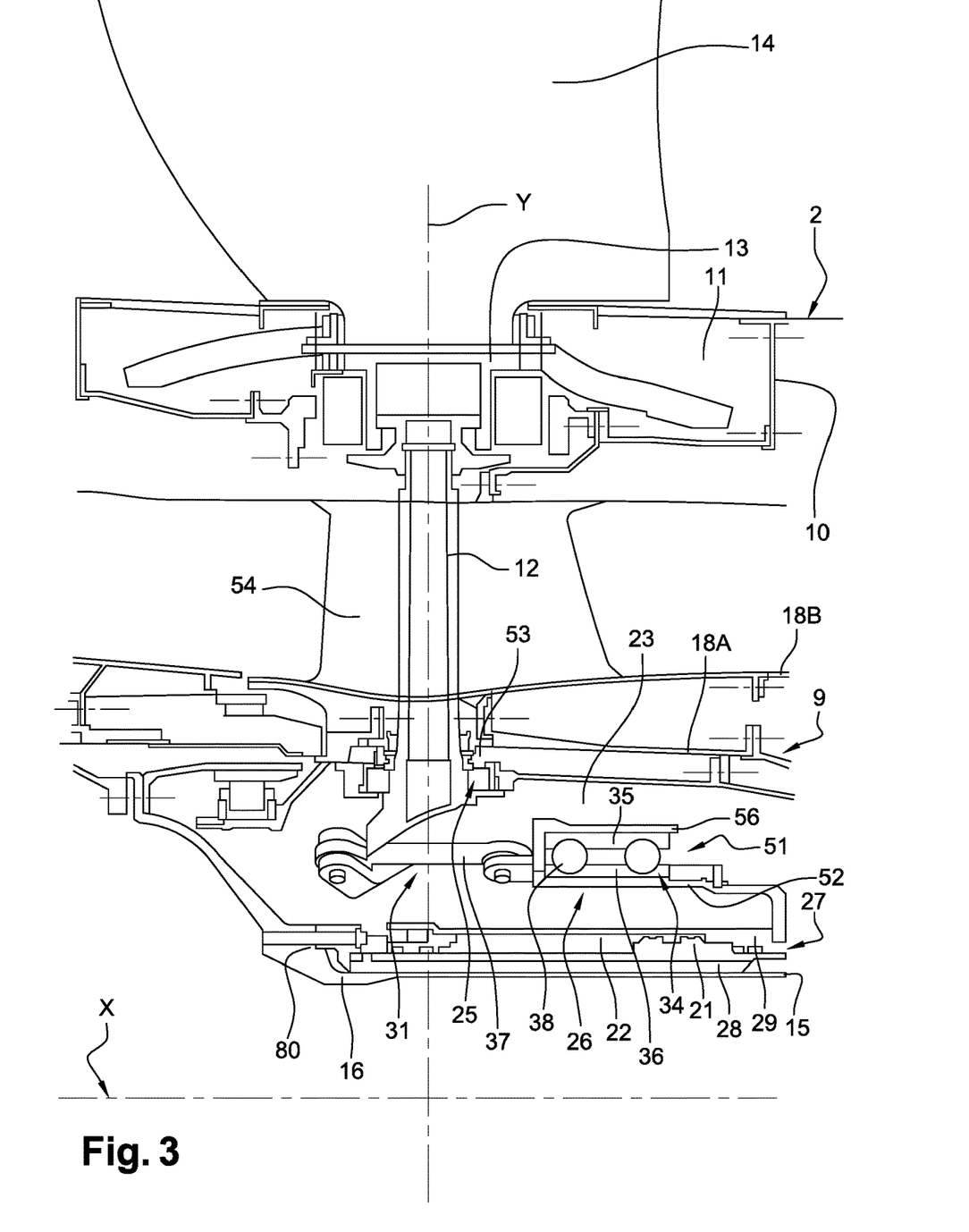
FIG. 3 is an axial sectional view schematically showing more details of the elements of a pitch change system connected to a blade of a propeller according to the invention.

FIG. 3 shows a case 9, here cylindrical, mounted rotatably with respect to the stationary nacelle 2 of the turbine engine around a rotor shaft with longitudinal axis X. The rotary case 9 is also connected to a corresponding part of the mechanical transmission device 17. This rotary case 9 or rotor case comprises several skins or walls of revolution, including at least a first outer wall 18A relative to a radial axis Y perpendicular to the longitudinal axis X. In the rest of the description, the terms "upper" and "lower" are defined relative to the radial axis Y. The rotary case 9 comprises radial housings 11 and radial passages 53 that are coaxial and that are each traversed by a shaft 12 with radial axis Y, hereinafter radial shaft 12, connected to a root 13 of a blade 14 of the corresponding propeller 6, 7. The blades 14 extend radially outside the nacelle 2. In particular, the rotary case 9 comprises a polygonal ring 10, provided with radial housings 11, here cylindrical, regularly distributed over its periphery. The first outer wall 18A comprises the radial passages 53, here cylindrical, regularly distributed over its periphery and traversed by the radial shaft 12. The latter extend radially through a structural arm 54 connecting the polygonal ring 10 to a second outer wall 18B of the cylindrical case 9. This second outer wall 18B is downstream from the median case 40. It forms part of the radially inner wall of the gas flow tunnel. Each radial shaft 12 is kept in its housing 53 using rotational guide bearings 25 making it possible to keep the radial shafts in their housings 53. The rotary case 9 is directly supported by rolling bearings on a stationary case 15, here cylindrical, or stator case to ensure its rotation relative to the longitudinal axis X. The stationary case 15 and the rotary case 9 are coaxial.

The turbine engine comprises a system 26 for changing the pitch of the blades 14 of the propeller 6 making it possible to vary the calibration or the pitch of the blades 14 around their radial axes A such that they occupy angular positions according to the operating conditions of the turbine engine and the flight phases in question.

Figure 4:
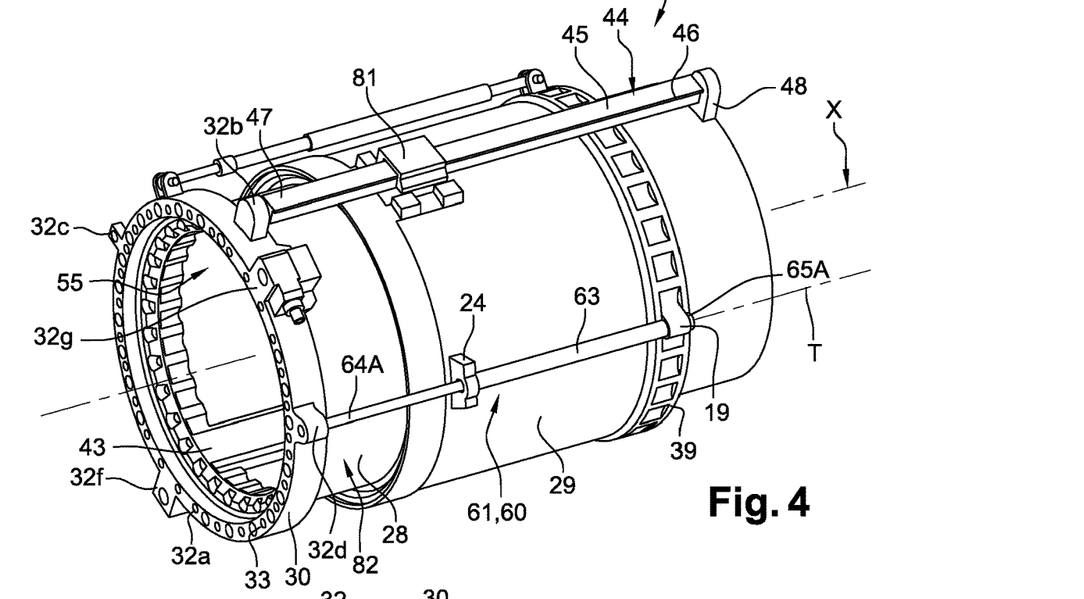
FIG. 4 is a perspective view of an example control means according to the invention.

In FIG. 3, the pitch change system 26 comprises a control means 27 controlling the pitch change of each of the blades 14 and a connecting mechanism 31 connecting the control means 27 to the roots 13 of the blades 14. The control means 27, more precisely illustrated in FIG. 4, is housed between the rotary case 9 and the stationary case 15. The control means 27 comprises a stationary body 28 and a movable body 29 translatable relative to the stationary body 28 along the axis X. This control means 27 is attached on the stationary case 15. In other words, the latter is separated from the stationary case 15 and does not constitute a structural element belonging to the stationary case 15. The control means 27 is arranged so as to move the connecting mechanism 31 axially, which is connected to the radial shafts 12 of the blade roots such that the axial movement of the connecting mechanism 31 causes the pitch change of the blades. The radial shafts 12 pivot around the axis Y in the radial passages 53 and radial housings 11. To that end, the pitch change system 26 comprises means 20 for supplying fluid to the control means 27, ensuring the control thereof. The stationary body 28 comprises a radial wall 21 here defining two variable displacement chambers 22 in the movable body 29 and that are axially opposite one another. The two chambers 22 are intended to receive the fluid, such as a pressurized hydraulic fluid, from a fluid supply source 23 such that the movable body 29 occupies at least two extreme positions. The extreme positions are defined by the minimum and maximum volumes of hydraulic fluid occupying the two variable-displacement chambers. In particular, the positions correspond to a so-called "reverse" position, in which the blades participate in the braking of the aircraft, like standard thrust reversers, and a so-called "feathering position", in which the blades are then retracted as much as possible relative to the direction of advance of the airplane, for example, in case of failure of the turbine engine.

The pitch change system 26 also comprises a load transfer module 51 equipped with a load transfer bearing 34 and arranged between the connecting mechanism 31 and the movable body 29 so as to transmit the axial forces exerted by the movable body 29. The load transfer module 51 comprises an annular outer shroud 56 and inner shroud 52. The outer shroud 56 is connected to the connecting mechanism 31, while the inner shroud 52 is connected to the movable body 29. This bearing 34 comprises an outer ring 35 secured to the shroud 56 and an inner ring 36 secured to the shroud 52. The bearing 34 here is formed by a rolling bearing with two rows of balls 38 that may be of the type with oblique contact oriented in opposite directions so as to optimize the transmission of the axial forces. The connecting mechanism 31 further comprises a set of articulated connecting rods 37 that are distributed regularly around the control means 27 and that are intended to act on the roots of the blades 14 via the radial shafts 12 to rotate them around their axis Y. There are as many connecting rods 37 as there are blades.

In the present invention, the control means 27 comprises an actuator that advantageously includes an annular control cylinder made up of its rod moving relative to a cylinder secured to the stationary case 15. The moving rod is formed by the movable body 29, while the stationary cylinder is formed by the stationary body 28.

Figure 5:
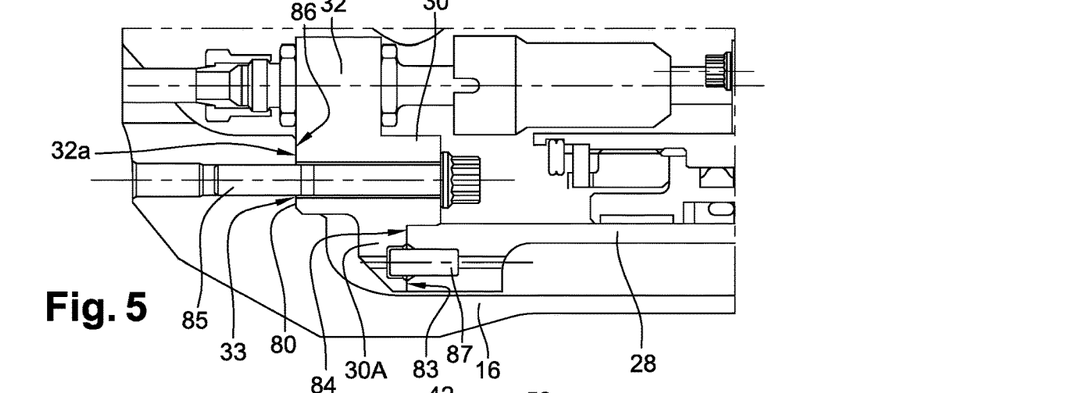
FIG. 5 is a partial axial and detailed sectional view of one embodiment of an assembly of a connecting ring of a control means on the stationary case.

In reference to FIG. 4, which shows the actuator more precisely, the stationary body 28 is cylindrical with a circular section. The movable body 29 is arranged around the stationary body 28. The stationary body 28 surrounds the cylindrical wall 16 of the stationary case 15 and is coaxial with the longitudinal axis X. The stationary body 28 is assembled secured to this cylindrical wall 16 so as to be immobilized in rotation and translation relative to the stationary case 15. To that end, the stationary body 28 comprises a connecting ring 30 provided at an upstream end of the stationary body 28. This connecting ring is abutting against a shoulder 80 of the stationary case 15 (cf. FIGS. 3 and 5). As illustrated in FIG. 5 in particular, the connecting ring 30 comprises an annular tab 30A extending radially inward relative to the axis X. This tab 30A allows the control ring 30 to be fastened on the upstream end of the stationary body 28. Advantageously, the tab 30A is a single piece with the body of the fastening ring 30. This tab 30A has an annular face 83 defined in a plane perpendicular to the axis X in contact with another corresponding annular face 84 of the upstream end of the stationary body 28. These faces 83 and 84 are across from one another. Fastening means 87 such as pins, screws or other similar elements make it possible to secure the connecting ring 30 on the stationary body 28.

In an alternative embodiment that is not shown, the connecting ring 30 is formed in a single piece with the stationary body 28. In other words, the connecting ring 30 and the stationary body 28 are one piece.

Furthermore, the connecting ring 30 is mounted forcibly on the stationary case 15. Alternatively or additionally, the connecting ring can be mounted on the stationary case 15 using pins 85 or screws to ensure the fastening to the structural parts of the turbine engine. In particular, the connecting ring 30 comprises an upstream border 33 that overhangs the tab 30A. This border 33 has an annular surface defined in a plane perpendicular to the longitudinal axis X. This annular surface is in contact with another corresponding annular surface 86 formed by the shoulder 80.

The connecting ring 30 is provided with several connecting interfaces 32 allowing the connection of various pieces of equipment necessary for the power supply and operation of the actuator as well as the pitch changing system.

In the present example, these connecting interfaces 32 ensure a hydraulic, mechanical and electrical connection of the actuator. Thus, this connecting ring 30 is multifunctional, since it makes it possible to produce a simultaneous and robust connection of all of the interfaces on the one hand, and a connection between the stationary and rotary parts on the other hand. Regarding this last aspect, the connecting ring must provide the reaction to the axial forces from the actuator. Here, a first mechanical connecting interface 32a makes it possible to secure the ring 30 to the shoulder 80 of the stationary case 15 (cf. FIGS. 3 and 5). This first mechanical connecting interface 32a is formed by the annular surface of the upstream border 33 of the connecting ring 30. The plane of the annular surface forming the connecting interface 32A and the plane of the annular face 83 are substantially parallel.

A second mechanical connecting interface 32b allows other connecting elements to be fastened to the movable body 29 and/or the stationary body 28. In particular, the second interface allows the fastening of an anti-rotation device 44 making it possible to immobilize the rotation of the movable body 29 relative to the stationary body 28. The movable body 29 moves only in translation. This anti-rotation device 44 in particular makes it possible to prevent the rotation of the actuator during the operation of the turbine engine around the longitudinal axis X. The anti-rotation device 44 includes a cross-piece 45 extending along an axis substantially parallel to the longitudinal axis X. The cross-piece 45 is fastened by a first end 46 to a yoke 48 secured to the downstream edge of the stationary body 28, and by an axially opposite second end 47 to the second mechanical connecting interface 32b of the connecting ring 30. The anti-rotation device 44 further includes a support 81 fastened on the movable body 29 serving as a radial stop. This support 81 is traversed by the cross-piece 45 and also allows guiding of the movable body 29 during its axial movement. In other words, the cross-piece 45 slides inside the support 81.

An electrical connecting interface 32c makes it possible to fasten a regulating harness (not shown) connected to a position sensor of the actuator. This position sensor is connected to an electronic computer of the turbine engine intended to process the position information sent by the position sensor. The latter is advantageously, but non-limitingly, a "LVDT" sensor as movement sensor of the actuator.

In this example, a low-pressure hydraulic connecting interface 32d is provided to supply lubricant for the lubrication means 60 of the load transfer bearing 34. The means 60 for lubricating the load transfer bearing 34 include at least one lubricant circulation conduit 61, the conduit 61 being configured to be connected to a lubricant supply source 23 so as to be supplied. This lubricant supply source is installed on the stationary parts of the turbine engine. The conduit 61 extends radially outside the movable body 29 relative to the longitudinal axis X, and in particular, axially along an axis T above the movable body 29 and the stationary body 28. The latter is connected on one side to the connecting interface 32d on which the lubricant supply source is connected, and on another side to the movable body 29. A first upstream end 64A of the conduit 61 is received in a first cavity of the interface in which it is fastened, while a second opposite end 65A is maintained in a second cavity of a first local boss 19 positioned at the downstream end 39 of the movable body 29. A portion of the conduit 61 is kept radially in position and guided by a second local boss 24 secured to the movable body 29. This second boss 24 allows the guiding of the conduit 61.

Two high-pressure hydraulic connecting interfaces are also arranged here, i.e., a first interface 32g and a second interface 32f, so as to allow the high-pressure (HP) supply of fluid for the two chambers 22 in order to allow the movement of the movable body 29. These first and second hydraulic HP interfaces 32f, 32g cooperate with the fluid supply means 20 described below in the description.

The connecting interfaces 32 are distributed over an outer cylindrical surface of the connecting ring 30. In the illustrated example, the connecting interfaces 32, 32b, 32c, 32f, 32g are arranged over about 360°. In particular, the first and second hydraulic HP connecting interfaces 32f, 32g are arranged and separated from one another along an angular sector of about 180°. In other words, they are diametrically opposite. The low-pressure hydraulic connecting interface 32d is arranged between the first and second connecting interfaces 32f, 32g. However, the connecting interfaces 32 can be distributed along a different angular sector. The distribution of the interfaces depends on the dimensions and structures of the actuator as well as the equipment to be connected. According to one advantageous, but non-limiting, feature, the connecting interfaces 32 are made in a single piece with the connecting ring 30. In other words, the ring 30 is completely machined with these connecting interfaces 32. It should be noted that these connecting interfaces 32 are stationary relative to the stationary case 15 and the movable body 29, given that the connecting ring 30 is secured to the stationary case.

Figure 6:
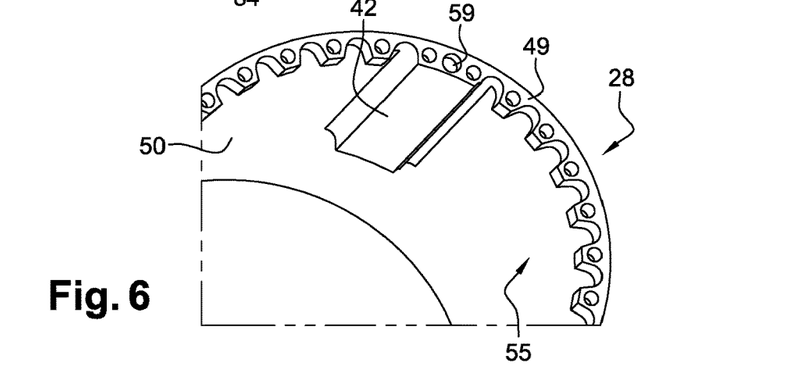
FIG. 6 is a partial perspective view of the inner part of a stationary body of an example control means according to the invention.
Figures 7, 8:
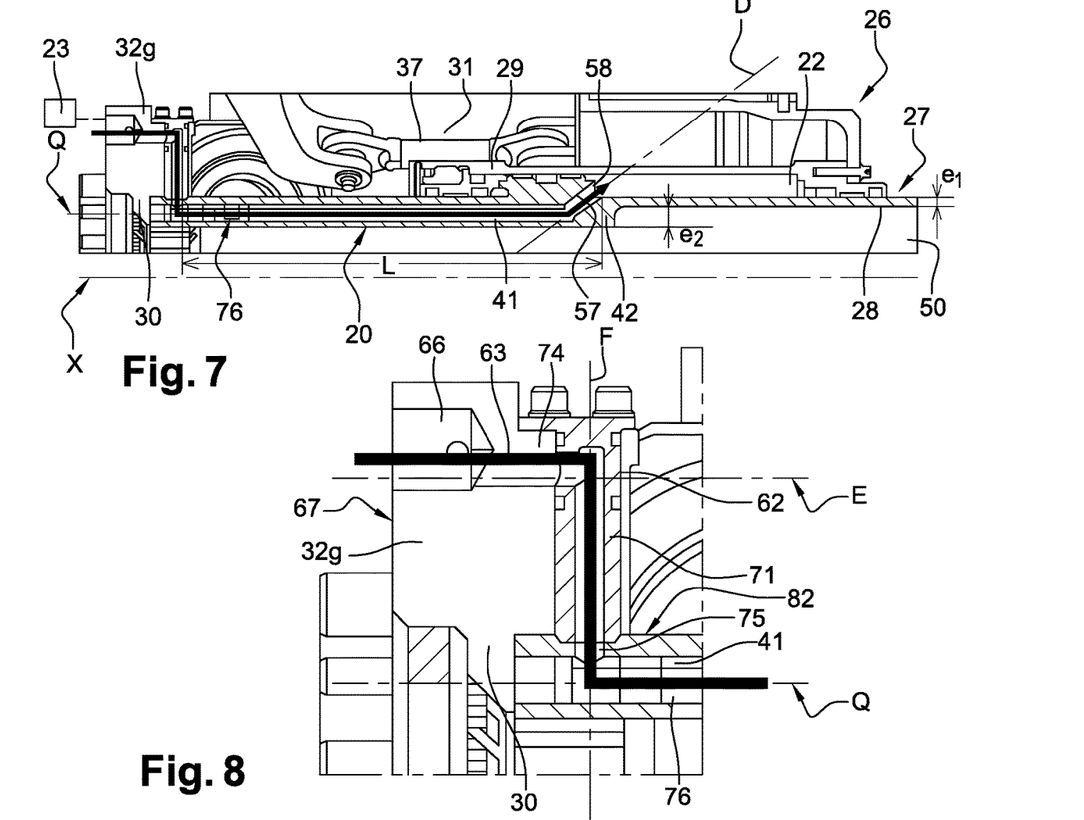
FIG. 7 is an axial sectional view of an example embodiment of fluid supply means for the control means according to the invention.
FIG. 8 is a detail view of an example embodiment of a connecting interface as illustrated in FIG. 7.

The fluid supply means 20 of the control means 27 are configured so as to be connected to the fluid supply source 23 and to supply the chambers 22 of the actuator. In FIGS. 6 to 8, the fluid supply means 20 includes at least one high-pressure channel 41 extending along an axis Q parallel to the longitudinal axis X. The pressure circulating in this channel is about 130 bars. In reference to FIG. 7, the channel 41 is fluidly connected to the first HP hydraulic connecting interface 32g on the one hand, and to at least one of the chambers 22 on the other hand. Below, we will describe the configurations of the first interface 32g and the channel 41, with the understanding that the second interface 32f is arranged identically. The channel 41 is arranged, as shown in FIGS. 6 and 7, in a first overthickness 42 of a cylindrical wall 50 of the stationary body 28. The latter more specifically comprises two overthicknesses, in each of which a channel is arranged. A second overthickness 43 is also visible in FIG. 4. In the present description, the term "overthickness" refers to a protrusion formed on an inner cylindrical surface 55 of the wall 50 of the stationary body 28. Each overthickness 42, 43 extends along a radial direction from the inner cylindrical surface 55 toward the longitudinal axis X. In other words, each overthickness 42, 43 extends radially inside the stationary body 28. The second overthickness 43 cooperates with the second hydraulic connecting interface 32f. The first overthickness 42 is described more precisely in the following description. Of course, the second overthickness 43 is configured identically.

The cylindrical wall of the stationary body 28 has a substantially constant thickness $e_1$. The overthickness 42 also extends along the longitudinal axis X. Each overthickness also extends at least partially along the inner cylindrical surface 55 of the wall of the stationary body 28. In particular, the latter extends from an upstream edge 49 of the stationary body 28 and a substantially median part of the stationary body 28. The overthickness has a thickness $e_2$ comprised between $2 \times e_1$ and $5 \times e_1$.

The high-pressure channel 41 comprises a channel portion 57 that communicates fluidly with the chambers 22 via a first orifice 58 emerging therein. The channel portion 57 extends the channel 41, the first end of which is fluidly connected to the connecting ring 30. The channel portion 57 extends along a direction D having a predetermined angle with the axis Q of the channel 41 so as to limit the pressure losses. This predetermined angle is comprised between 40° and 70°. Preferably, this angle is comprised between 45° and 60°. The channel 41 also comprises a second orifice 59 emerging outside the stationary body 28 at the upstream edge 49 of the stationary body 28 (cf. FIG. 6). The channel 41 comprises a length L and a diameter whose ratio is comprised between 20 and 40.

Figure 9:
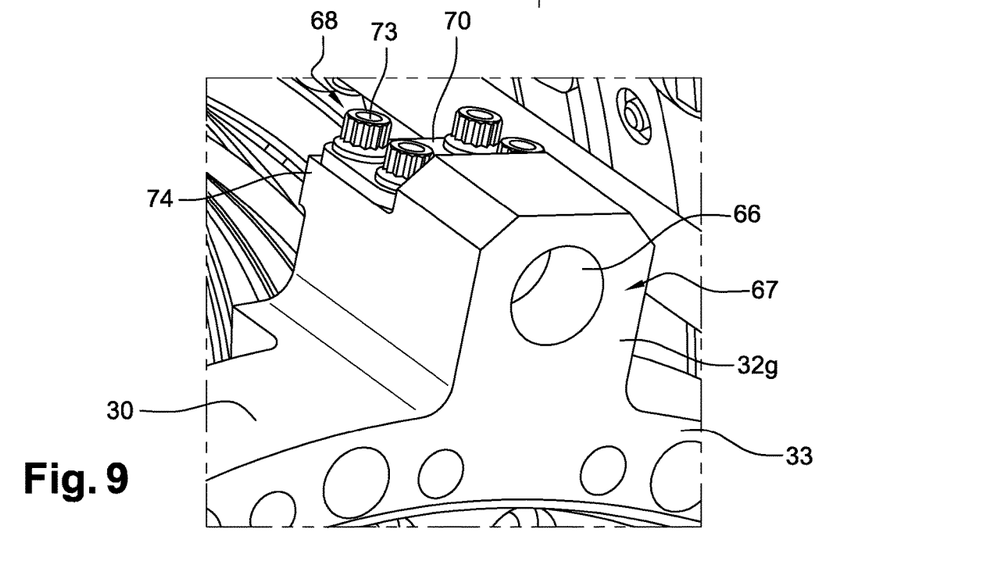
FIG. 9 is a perspective view of a first connecting interface of a connecting ring according to the invention.
Figure 10:
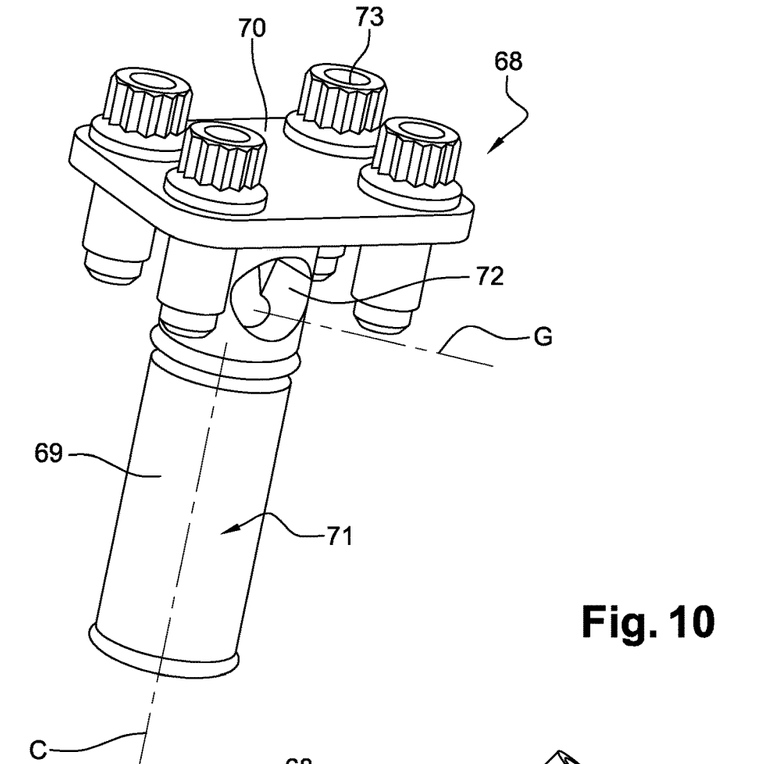
FIG. 10 is a perspective view of a connecting member intended to cooperate with a connecting interface, and in particular a first hydraulic connecting interface according to one embodiment of the invention.

As can be seen in more detail in FIGS. 8 and 9, the HP hydraulic connecting interface 32g comprises a radial bore 62 traversing the body of this interface all the way through along an axis F parallel to the radial axis Y. The first connecting interface 32g also comprises an axial bore 63 traversing the body of said first interface 32g all the way through along an axis E substantially parallel to the longitudinal axis X. The first connecting interface 32g comprises a spot facing 66 emerging on an upstream face 67 of said connecting interface 32g. The upstream face 67 is defined in the plane of the annular surface of the border 33. The spot facing 66 is connected coaxially to the axial bore 63. The fluid supply means 20 comprise a connecting member 68 fastened on the first HP hydraulic connecting interface 32g and arranged so as to fluidly connect the supply source and the channel 41. This connecting member 68 makes it possible to radially connect the first HP hydraulic interface 32g and the channel 41 bringing the fluid into the chambers 22. To that end, the connecting member 68 as shown in FIG. 10 comprises a hollow cylindrical body 69 with central axis C. A flange 70 extending in a plane perpendicular to the central axis C is secured to the cylindrical body 69. The cylindrical body 69 comprises a cylindrical wall 71 in which a hole 72 with axis G is arranged emerging radially in the hollow cylindrical body 69. The cylindrical body 69 is housed coaxially in the radial bore 62 of the first HP interface 32g. The hole 72 is arranged coaxially with the axial bore 63 of the first HP interface 32g. The wall 50 of the stationary body 28 further comprises an opening 75 (cf. FIG. 8) emerging on the one hand on an outer cylindrical surface 82, radially opposite the inner cylindrical surface 55, and on the other hand in the channel 41. The hollow cylindrical body 69 is also mounted coaxially with the opening 75. The first interface 32g is connected to the fluid supply source 23 arranged on the stationary parts of the turbine engine. In this way, the hydraulic fluid can circulate from the fluid supply source 23 through the first HP hydraulic connecting interface 32g via the connecting member 68 toward the chambers 22 of the actuator. The high-pressure hydraulic fluid is an oil. The flange 70 of the connecting member 68 is fastened using appropriate fastening members, here screws 73 with a step 74. The step 74 is formed by a notch in the upper part of the first connecting interface 32g. Thus, this attached connecting member 68 makes it possible to offset the manufacturing issues that may arise. In one alternative embodiment that is not shown, the hydraulic fluid can circulate directly from the supply source through the first connecting interface and the channel 41. In other words, this alternative does not include the installation of the connecting member.

The channel 41 is further equipped with a flow rate limiter 76 at its inlet orifice 59 so as to monitor the hydraulic fluid flow rate circulating in the channel 41 toward the chambers 22. In particular, the flow rate limiter 76 prevents the flow rate in the channel from exceeding a predetermined flow rate value so as to limit the angular movement speeds of the blades. The flow rate limiter 76 is thus arranged in the overthickness 42 of the stationary body 28. The thickness of the overthickness must account for the dimensions of this flow rate limiter 76 also to facilitate the drilling of the channel 41.

Figure 11:
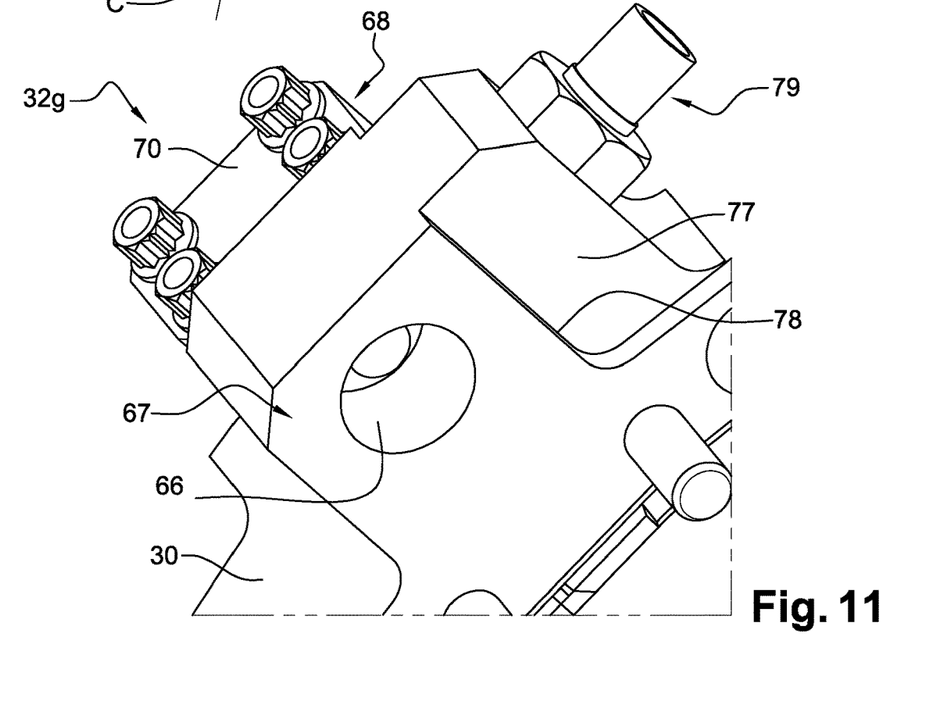
FIG. 11 is a perspective view of a hydraulic connecting interface on which measuring means according to one example embodiment of the invention are assembled.

In reference to FIG. 11, the first hydraulic connecting interface 32g comprises a protrusion 77 extending from a side flank 78 along a circumferential direction of the connecting ring 30. The side flank 78 is perpendicular to the face 67 of the first interface 32g. This protrusion 77 carries means 79 for measuring physical parameters of the fluid traversing the first connecting interface 32g. The measuring means 79 advantageously, but non-limitingly, comprise pressure and/or temperature sensors. Thus, this interface also facilitates the integration of measuring means within this pitch changing system without affecting the bulk.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for changing the pitch of blades of at least one turbine engine propeller provided with multiple blades, the system comprising a control means acting on a connecting mechanism connected to the blades of the propeller, said control means including a stationary body and a movable body translatable along a longitudinal axis relative to said stationary body and defining two chambers, and fluid supply means configured to be connected to a fluid supply source and to supply said chambers, the supply means comprising at least one channel, wherein the channel is arranged and extends along an axis parallel to the longitudinal axis in an overthickness of a wall of the stationary body, the overthickness extending radially inside the stationary body and at least partially along an inner cylindrical surface of the wall of the stationary body relative to the longitudinal axis, the system further comprising a connecting ring secured upstream from the stationary body, the connecting ring comprising a first connecting interface, wherein the first connecting interface is a hydraulic connecting interface of the control means, the channel being connected to the hydraulic connecting interface of the connecting ring connected to the fluid supply source, and to at least one of the chambers, the channel comprising a channel portion communicating fluidly with the chambers by a first orifice emerging therein.

2. The system according to claim 1, wherein the overthickness has a thickness between $2xe_1$ and $5xe_1$, $e_1$ being the thickness of the wall of the stationary body.

3. The system according to claim 1, wherein the channel portion extends along a direction having a predetermined angle with the axis of the channel.

4. The system according to claim 3, wherein the predetermined angle is between 40° and 70°.

5. The system according to claim 1, wherein the fluid supply means comprise a flow rate limiter arranged in the overthickness and equipping the channel.

6. The system according to claim 1, wherein the connecting ring is secured to a stationary case of the turbine engine.

7. The system according to claim 1, wherein the connecting ring further comprises at least one second connecting interface, the hydraulic connecting interface and the at least one second connecting interfaces being distributed over an outer cylindrical surface of the connecting ring.

8. The system according to claim 7, wherein the channel is connected by a first end to the hydraulic connecting interface connected to the fluid supply source.

9. The system according to claim 1, wherein the fluid supply means comprise a connecting member fastened on the hydraulic connecting interface and arranged to fluidly connect the supply source and the channel.

10. The system according to claim 9, wherein the connecting member is provided with a hollow cylindrical body, said hydraulic connecting interface comprising a radial bore in which the hollow cylindrical body is housed coaxially and an axial bore coaxial with an orifice arranged in a wall of the cylindrical body so as to allow fluid circulation between the connecting ring and the channel.

11. The system according to claim 9, wherein the hydraulic connecting interface is a high-pressure hydraulic interface.

12. The system according to claim 1, wherein the hydraulic connecting interface comprises at least one protrusion extending from a side flank of said hydraulic connecting interface and carrying elements for measuring physical parameters of the fluid traversing said hydraulic interface.

13. A turbine engine comprising at least one pitch change system according to claim 1.

14. The system according to claim 1, wherein the channel portion is formed in the stationary body.

15. The system according to claim 1, wherein the connecting ring further comprises a first mechanical connecting interface configured to secure the connecting ring to the stationary body.

16. The system according to claim 15, wherein the connecting ring further comprises a second mechanical connecting interface configured to connect an anti-rotation device configured to immobilize rotation of the movable body relative to the stationary body.

17. The system according to claim 1, wherein the connection ring further comprises an electrical connecting interface linked to means for transmitting information about position of the movable body.

18. The system according to claim 1, wherein the connection ring further comprises at least one of a mechanical connecting interface and an electrical connecting interface, the hydraulic connecting interface and the at least one of a mechanical connecting interface and an electrical connecting interface being formed in a single piece with the connecting ring.

19. The system according to claim 1, wherein the channel portion of the channel opens on an outer cylindrical surface of the wall of the stationary body.

20. The system according to claim 1, wherein the movable body extends around the stationary body.

* * * * *